2,990,414
17-UNDECENOATE OF ESTRADIOL
Howard J. Ringold, Enrique Batres, and George Rosenkranz, Mexico City, Mexico, assignors to Syntex S.A., Mexico City, Mexico, a corporation of Mexico
No Drawing. Filed Mar. 18, 1958, Ser. No. 722,141
Claims priority, application Mexico Mar. 26, 1957
2 Claims. (Cl. 260—397.5)

The present invention relates to novel cyclopentanophenanthrene derivatives and to a novel process for their production.

More particularly the present invention relates to the novel 17-undecenoate of estradiol a process for the production thereof and the novel diester intermediates for the production of the 17-undecenoate. The 17-undecenoate of estradiol is a novel estrogenic hormone having an especially valuable prolonged action as compared to estradiol and its known esters.

In accordance with the present invention it has been discovered that the 3,17-diesters of estradiol wherein the 17-ester is the undecenoate may be readily selectively hydrolyzed to give the 17-mono undecenoate. This is especially true when the 3-acyloxy group is that derived from a lower aliphatic acid or benzoic acid. The novel process of the present invention therefore involves the esterification of free estradiol or a 3-mono-ester of estradiol with undecenoyl chloride to form the novel intermediate diesters and the selective hydrolysis at C-3 of the ester group to give the novel estrogenic prolonged action hormone namely the 17-undecenoate of estradiol.

The process of the present invention and the formation of the novel compounds referred to previously may be illustrated by the following equation:

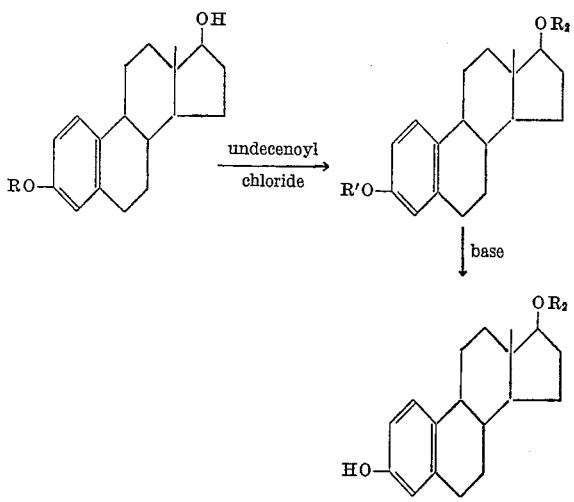

In the above equation R represents hydrogen or an acyl group preferably that derived from a lower aliphatic acid of less than 7 carbon atoms or benzoic acid. $R_1$ represents an acyl group which may be the same as that of R or undecenoyl and $R_2$ represents the undecenoyl group.

In practicing the process above outlined estradiol or a known 3-mono ester thereof such as the 3-monoacetate or the 3-monobenzoate in pyridine is cooled to below room temperature and then treated with undecenoyl chloride in slight excess over that required to esterify the free hydroxyl group or groups. Thus if estradiol is used slightly over 2 molar equivalents are added and if a 3-monoester of estradiol is used slightly over 1 molar equivalent of undecenoyl chloride is added. The reaction mixture is maintained below about 40° C. during the addition and thereafter is kept standing at room temperature for a time sufficient to complete the reaction. After conventional separation procedures there is then obtained the corresponding 3,17-diester of estradiol. This diester is selectively hydrolyzed by reaction with a base, such as potassium carbonate in a water-lower aliphatic alcohol medium for a period of time from about 2 to 30 hours. If the 3-ester group is that of a lower aliphatic acid or benzoic acid the lower period of time is sufficient and if the 3-ester group is that of undecenoic acid the longer period of time is desirable.

The following specific examples serve to illustrate but are not intended to limit the present invention.

*Example I*

A solution of 100 g. of estradiol in 500 cc. of anhydrous pyridine was cooled in an ice bath to approximately 10° C. and then treated with 150 g. (2.5 molar equivalents) of undecenoyl chloride which was added slowly and taking care that the temperature of the mixture did not rise over 40° C. At the end of the addition of the acid chloride the mixture was kept standing at room temperature for 15 hours and then heated on the steam bath for half an hour. It was then poured into water and extracted with ether, and the extract was washed with 5% hydrochloric acid, water, dilute sodium carbonate solution and water, dried over anhydrous sodium sulfate and evaporated to dryness. The oily residue consisted of the di-undecenoate of estradiol.

This crude diester was mixed with 100 cc. of methanol and the resulting suspension was stirred and treated with a solution of 36.5 g. (approximately 2 molar equivalents) of potassium carbonate in 500 cc. of water and 4500 cc. of methanol, which was slowly added to the mechanically stirred suspension. The stirring was continued for 30 hours further and then the mixture was neutralized with acetic acid, diluted with 1200 cc. of water, cooled and extracted with ether. The extract was washed with water until neutral, dried over anhydrous sodium sulfate and evaporated to dryness. Crystallization of the residue from ether-methanol gave the 17-undecenoate of estradiol in the form of small plates, M.P. 105–106° C., $[\alpha]_D + 42°$ (chloroform), ultraviolet absorption maximum at 280–282 m$\mu$ (log E 3.30).

*Example II*

Similarly to Example I, the 3-benzoate of estradiol was treated with 1.25 molar equivalents of undecenoyl chloride; there was thus obtained the 3-benzoate-17-undecenoate of estradiol in the form of an oil. This compound was selectively hydrolyzed at C-3 by reaction with an aqueous methanolic solution of potassium carbonate in a similar manner to Example I but for 2 hours. There was thus obtained the 17-undecenoate of estradiol, identical to the one obtained in Example I.

When the 3-acetate of estradiol was treated in the same way there was produced the same final product and as an intermediate the 3-acetate-17-undecenoate of estradiol.

We claim:
1. A compound of the following formula:
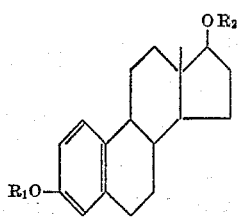
wherein $R_2$ represents undecenoyl and $R_1$ is selected from the group consisting of lower fatty acyl, benzoyl and undecenoyl.
2. The 17-undecenoate of estradiol.
References Cited in the file of this patent
UNITED STATES PATENTS
| | | |
|---|---|---|
| 2,160,555 | Miescher et al. | May 30, 1939 |
| 2,205,627 | Miescher et al. | June 25, 1940 |
| 2,611,773 | Ott | Sept. 23, 1952 |
| 2,842,567 | Haack et al. | July 8, 1958 |
| 2,867,630 | Pederson et al. | Jan. 6, 1959 |